United States Patent [19]

Yokoo et al.

[11] Patent Number: 5,020,877

[45] Date of Patent: Jun. 4, 1991

[54] REAR PROJECTION SCREEN

[75] Inventors: Toru Yokoo; Takashi Kobane; Akihiko Seki; Yasuhiro Yamakawa; Yoshikazu Kawakami, all of Tokyo, Japan

[73] Assignee: Pioneer Electronic Corp., Tokyo, Japan

[21] Appl. No.: 514,804

[22] Filed: Apr. 26, 1990

[30] Foreign Application Priority Data

Nov. 7, 1989 [JP] Japan .................................. 1-287954

[51] Int. Cl.⁵ ............................................ G03B 21/60
[52] U.S. Cl. .................................................... 350/128
[58] Field of Search ............................... 350/127–129; 353/38, 74, 79, 30, 94; 358/60, 231, 239

[56] References Cited

U.S. PATENT DOCUMENTS

| 2,567,654 | 9/1951 | Siezen | 350/127 |
|---|---|---|---|
| 2,567,655 | 9/1951 | Siezen | 350/127 |
| 4,636,035 | 1/1987 | Clausen et al. | 350/128 |
| 4,725,134 | 2/1988 | Ogino | 350/128 X |
| 4,880,292 | 11/1989 | Kageyama et al. | 350/128 |
| 4,919,515 | 4/1990 | Hasegawa et al. | 350/128 |
| 4,919,518 | 4/1990 | Ogino et al. | 350/128 |
| 4,961,642 | 10/1990 | Ogino | 350/127 X |

Primary Examiner—Richard A. Wintercorn
Attorney, Agent, or Firm—Sughrue, Mion, Zinn, Macpeak & Seas

[57] ABSTRACT

A rear projection screen comprises, in combination, a Fresnel lens having concentric annular ridges arranged at a radial pitch of P1, and a lenticular lens having parallel lenticulars arranged at a pitch P2. The pitch ratio P1/P2 between the pitches P1 and P2 is determined in the range of 0.1505 to 0.1545 or in the range of 0.176 to 0.181. The rear projection screen meeting such a condition suppresses effectively the moiré effect of the concentric annular ridges of the Fresnel lens and the parallel lenticulars of the lenticular lens disposed adjacent to the Fresnel lens.

1 Claim, 2 Drawing Sheets

REAR PROJECTION SCREEN

BACKGROUND OF THE INVENTION

1. Field of the Invention

The present invention relates to a rear projection screen provided with a Fresnel lens and a lenticular lens and capable of suppressing moiré effect.

2. Description of the Prior Art

A rear projection display uses a rear projection screen for making visible a television for viewing in an enlarged image. A known rear projection screen is provided with a Fresnel lens and a lenticular lens. The Fresnel lens gathers as much of the light projected from an image projector as possible and directs the light toward the viewers to prevent the reduction of brightness of the peripheral portion of the image. The lenticular lens disperses the light laterally for laterally directional projection.

Since the Fresnel lens and the lenticular lens are disposed close to each other, a moiré effect is developed by the cooperative effect of the furrows of the Fresnel lens and those of the lenticular lens to deteriorate the quality of the image displayed on the rear projection screen. The degree of intensity of the moire effect is depedent principally on the pitch ration between the pitch of the Fresnel lens and that of the lenticular lens, and hence the pitches of these lenses must be determined in a proper ratio to prevent the moiré effect.

SUMMARY OF THE INVENTION

Accordingly, it is an object of the present invention to provide a rear projection screen provided with a Fresnel lens and a lenticular lens, characterized in that the pitch ratio between the pitch of the Fresnel lens and that of the lenticular lens are determined selectively so that the moiré effect is suppressed.

To achieve the object the present invention provides a rear projection screen provided with a Fresnel lens and a lenticular lens, characterized in that the pitch ratio $P1/P2$ of the pitch $P1$ of the Fresnel lens to the pitch $P2$ of the lenticular lens is in the range of 0.1505 to 0.1545 or in the range of 0.176 to 0.181.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Figure 1:
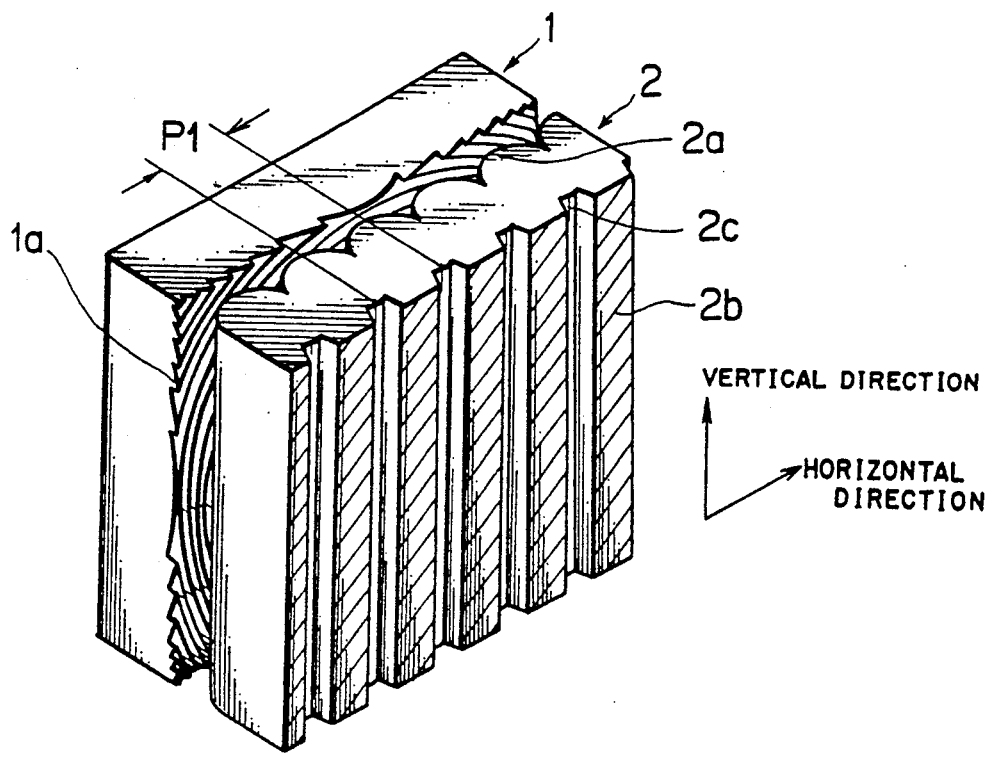
FIG. 1 is a fragmentary perspective view of a rear projection screen in a preferred embodiment according to the present invention.
Figure 2:
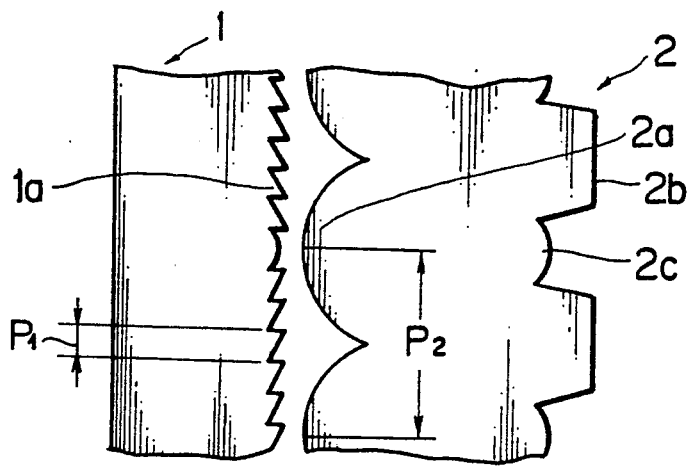
FIG. 2 is a fragmentary sectional view of the rear projection screen of FIG. 1 on a central horizontal plane.

Referring to FIG. 1 and 2, there are shown a Fresnel lens 1 constructed with concentric annular ridges 1a, and a lenticular lens 2 constructed with vertical lenticulars 2a, i.e., cylindrical lenses, arranged along a horizontal direction. The Fresnel lens 1 is disposed on the side of a projector, not shown, with its concentric annular ridges 1a facing the lenticular lens 2. The lenticular lens 2 is disposed after the Fresnel lens 1 with respect to the direction of travel of light projected by the projector with its lenticulars 2a facing the concentric annular ridges 1a.

As shown in FIG. 2, the radial pitch $P1$ of the concentric annular ridges 1a of the Fresnel lens 1, and the horizontal pitch $P2$ of the lenticulars 2a of the lenticular lens 2 are determined selectively so that moire effect may be suppressed to least extent. Hatched portions in FIG. 1 are black stripes 2b formed by printing or suitable means on the surface opposite the surface provided with the lenticulars 2a, namely, the front surface of the rear projection screen. The black stripes 2b are arranged along a horizontal direction. Outlet lenticulars 2c having a width smaller than that of the lenticular 2a are formed in furrows between the adjacent black stripes 2b, respectively. The black stripe 2b and the exit lenticulars 2c are arranged so that the optical axes of the exit lenticulars 2c coincide with those of the corresponding lenticulars 2a, respectively. The respective pitches of the black stripes 2b and the exit lenticulars 2c are substantially equal to that of the lenticulars 2a.

The pitch $P2$ of the lenticulars 2a of the lenticular lens 2 is 0.9 mm. The pitch $P1$ of the concentric annular ridges 1a of the Fresnel lens 1 is determined selectively so that the pitch ratio $P1/P2$ may be in an appropriate range shown in the following table.

| P2 (mm) | 0.9 | 0.9 |
|---|---|---|
| P1/P2 | 0.1505 to 0.1545 | 0.176 to 0.181 |
| P1 (mm) | 0.136 to 0.139 | 0.158 to 0.163 |

The appropriate ranges of pitch ratio shown in the table have been determined experimentally by varying the pitch $P1$ of the concentric annular ridges 1a of the Fresnel lens 1 for a fixed pitch $P2$ of 0.9 mm. of the lenticulars 2a of the lenticular lens 2.

Figure 3:
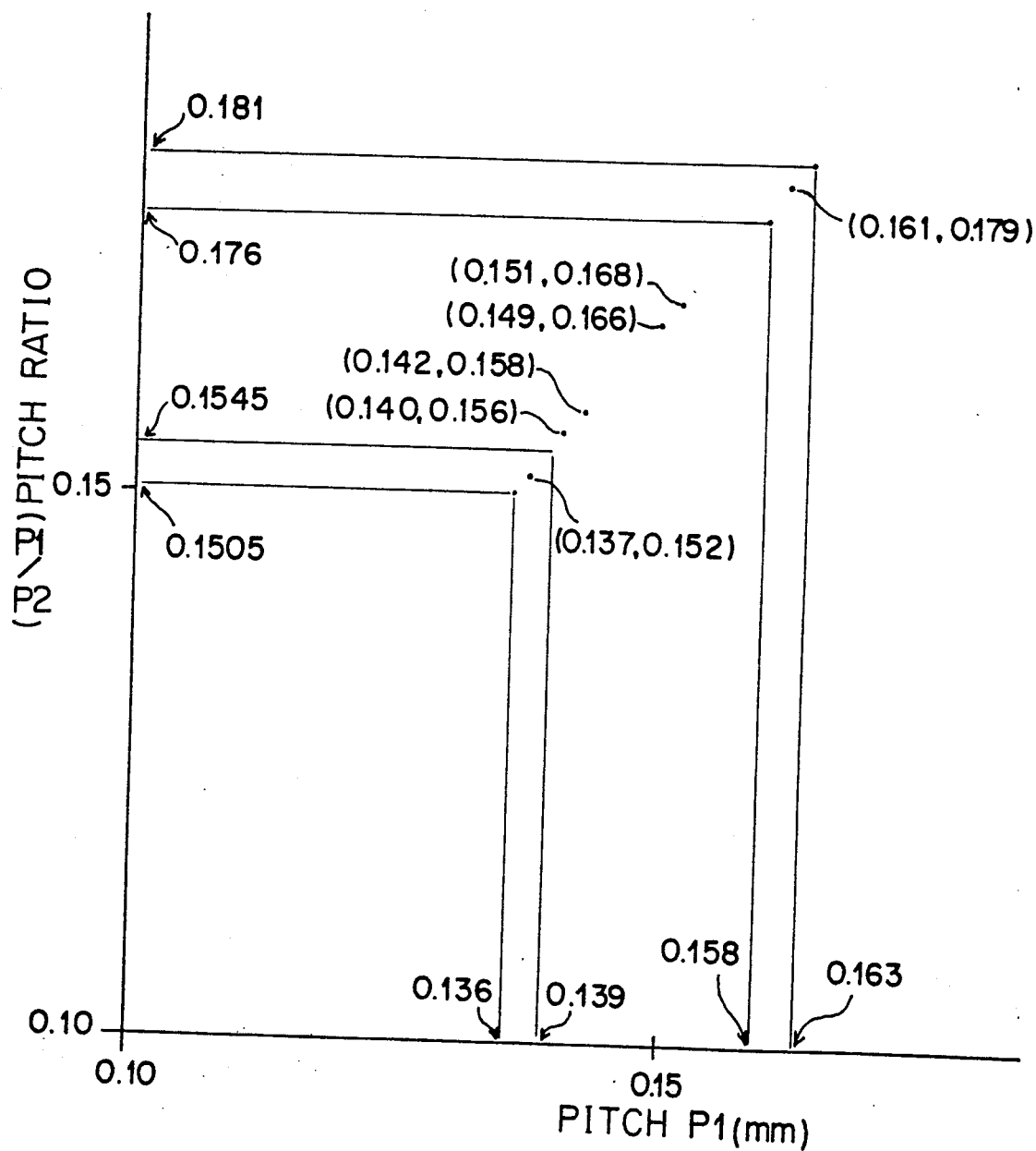
FIG. 3 is a graph of assistance in explaining an experimental procedure for deciding the pitch ratio of the rear projection screen of FIG. 1.

Referring to FIG. 3, the pitch $P1$ (mm) is measured to the right on the horizontal axis, and the pitch ratio $P1/P2$ is measured upward on the vertical axis. In the experiments, sample rear projection screens were examined fro moiré effect while the pitch $P1$ of the concentric annular ridges 1a of the Fresenl lens 1 was varied in a step of 1 $\mu$m around 0.161 mm, in the ranges of 0.149 mm to 0.151 mm and 0.140 mm to 0.142 mm, and around 0.137 mm to find a pitch $P1$ appropriate to the suppression of the moiré effect.

Although the invention has been described in its preferred form with a certain degree of particularity, obviously may changes and variations are possible therein. It is therefore to be understood that the present invention may be practiced otherwise than as specifically described herein without departing from the scope and spirit thereof.

What is claimed is:

1. A reverse projection screen comprising, in combination, a Fresnel lens and a lenticular lens, characterized in that the pitch ratio $P1/P2$ between the radial pitch $P1$ of the concentric annular ridges of the Fresnel lens and the pitch $P2$ of the lenticulars of the lenticular lens is in the range of 0.1505 to 0.1545 or in the range of 0.176 to 0.181.

* * * * *